United States Patent [19]

Seifert

[11] 3,751,041

[45] Aug. 7, 1973

[54] METHOD OF UTILIZING STANDARDIZED PUNCH CARDS AS PUNCH CODED AND VISUALLY MARKED PLAYING CARDS

[76] Inventor: Thomas G. Seifert, 2533 N.W. 56, Oklahoma City, Okla. 73112

[22] Filed: Mar. 5, 1971

[21] Appl. No.: 121,469

[52] U.S. Cl. ....... 273/149 P, 209/110, 235/61.12 R
[51] Int. Cl. .............................................. A63f 1/06
[58] Field of Search ..................... 273/149 P, 152.1; 209/110, 110.5; 235/61.12 R

[56] References Cited

UNITED STATES PATENTS

| | | | |
|---|---|---|---|
| 3,716,238 | 2/1973 | Porter | 273/149 P |
| 3,586,334 | 6/1971 | Baumann | 273/149 P |
| 834,189 | 10/1906 | Chadbourne | 273/149 P UX |
| 2,310,445 | 2/1943 | Lang | 235/61.12 R |
| 2,054,811 | 9/1936 | Goerlitz | 235/61.12 R |

*Primary Examiner*—Anton O. Oechsle
*Attorney*—Dunlap, Laney, Hessin & Dougherty

[57] ABSTRACT

The method of formation of playing cards from a standardized codable card which is readable with automated data processing equipment such that the playing cards may be more readily sorted and/or susceptible of game playing analysis through use of conventional computational equipment. The coded playing cards constructed in accordance with the invention are particularly suitable for use in duplicate bridge games, e.g., large-scale tournament competition, but the invention also contemplates more limited usage with provision of individual playing card deck sensing devices suitable for home use or casual play.

11 Claims, 9 Drawing Figures

INVENTOR
THOMAS G. SEIFERT

BY
Dunlap, Laney, Hessin & Dougherty
ATTORNEYS

INVENTOR
THOMAS G. SEIFERT

BY
Dunlap, Laney, Hessin & Dougherty
ATTORNEYS

INVENTOR
THOMAS G. SEIFERT

BY Dunlap, Laney, Hessin & Dougherty
ATTORNEYS

METHOD OF UTILIZING STANDARDIZED PUNCH CARDS AS PUNCH CODED AND VISUALLY MARKED PLAYING CARDS

BACKGROUND OF THE INVENTION

1. Field of the Invention

The invention relates generally to improvements in playing cards and game devices and, more particularly, but not by way of limitation, it relates to improved playing cards and apparatus which serve to enable duplicate contract bridge more readily.

2. Description of the Prior Art

The prior art includes several types of electrical and mechanical card reading systems which serve to read a card having a particular suit, value and code indication for the purpose of placing the cards in either the north, east, south or west hands; and such reading devices are also primarily adapted for duplicate bridge play since they enable the re-constitution of pre-determined bridge hands for play by numerous parties for relative score evaulation. One particularly exemplary teaching of the broad type of card distribution device was the subject of the present inventor's prior U.S. Pat. No. 3,529,829 entitled "Playing Card Distribution Device" as issued on Sept. 22, 1970. This teaching dealt primarily with mechanisms for reading individual playing card codes for the purpose of effecting desired distribution of cards prior to competition game play. Various other reading devices have also been developed for the purpose of reading coded playing cards; however, prior devices are generally limited to individual use through manual insertion of each individual card to the sensing mechanism, a prohibitive practice time-wise for any sizeable tournament or contest application.

SUMMARY OF THE INVENTION

The present invention contemplates the making of playing cards through placement of suit and rank or value indicia, as well as coding indicia, on a standardized form of automated data processing card and in standard format to indicate table position, i.e., N, E, S or W. In a more limited aspect, the invention consists of forming the deck of playing cards from the like number of standardized data processing cards of suitable size and configuration. Specific, manually operable code reading devices may then be used to read selected indicia from the individual playing cards; or, the playing card deck can be automatically processed through conventional card sorting and/or data processing equipment to provide card sorting into hand distribution, e.g., contract bridge hands, as well as to analyze played hands for comparison with stored data relating to proper play of the particular card hands.

Therefore, it is an object of the present invention to provide the teaching of forming a deck of playing cards from a standard data processing card of desired size and configuration.

It is also an object of the present invention to provide a device for reading coded playing cards for distribution in predetermined hands, the device accepting various card shapes as long as coded in proper mode to indicate player position.

It is still further an object of the invention to provide a deck of codable playing cards which are playable in normal manner, yet which may be inserted directly into automated data processing equipment for sorting or analysis.

Finally, it is an object of the present invention to provide a deck of playing cards including card suit and value (sometimes called rank) as code indications from a like number of automated data processing cards, particularly, those cards known as the IBM System/3 punch cards.

Other objects and advantages of the invention will be evident from the following detailed description when read in conjunction with the accompanying drawings which illustrate the invention.

DETAILED DESCRIPTION OF THE INVENTION

Figure 1:
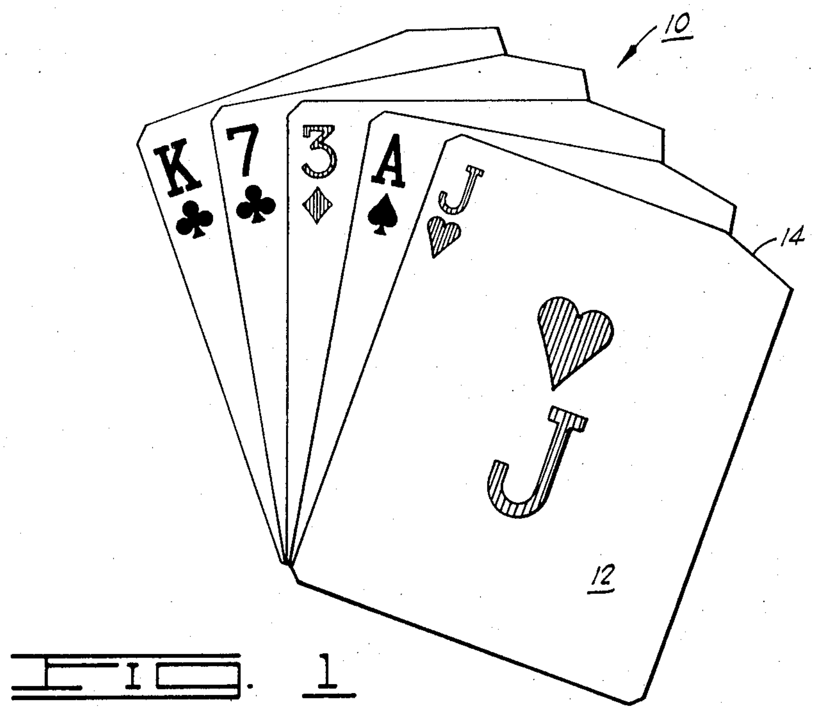
FIG. 1 is pictorial, face-view representation of playing cards constructed from IBM System/3 punch cards.

Referring now to FIG. 1, an example of a playing card formed in accordance with the invention is shown. Thus, a portion of a card hand 10 consists of five playing cards each formed on a card of the exact size and shape of a standardized IBM System/3 data processing card. Considering the jack of hearts playing card 12, the card is one of generally rectangular shape having a particularly shaped key corner 14 which serves to assure proper alignment of the card through reading and processing usage.

Figure 2A:
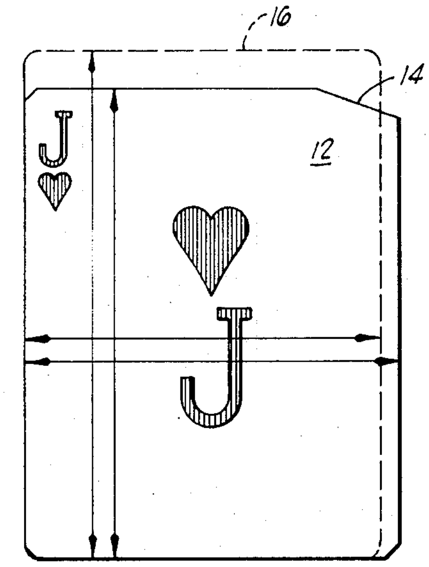
FIG. 2A is a plan view of a playing card formed from the System/3 punch card as compared to the standard playing card dimensions.
Figure 2B:
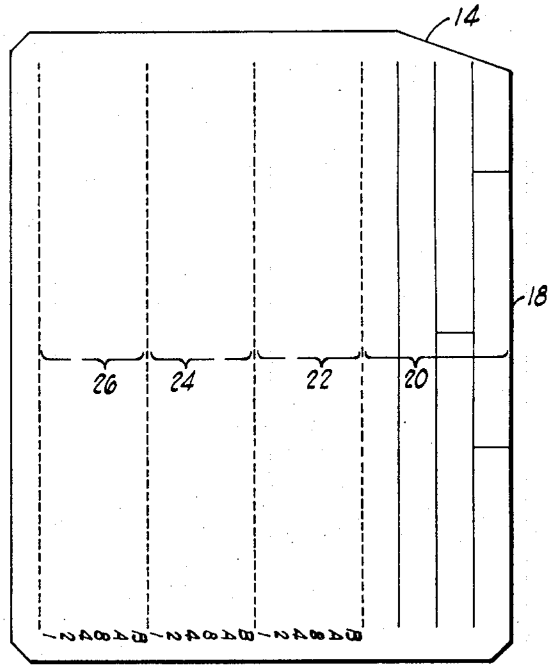
FIG. 2B is a plan view of the System/3 punch card showing the standard column and row relationships.

As shown in FIG. 2A, the System/3 data processing card, e.g., the jack of hearts playing card 12, compares favorably in size with the standard playing card size as indicated by dash lines 16. The standard playing card 16 is of rectangular shape having a length $l$ of 3 ½ inches and width $w$ of 2 ½ inches, while the System/3 playing card 12 has a length $l^1$ of 3 ¼ inches and width $w^1$ of 2 ⅝ inches. FIG. 2B illustrates further an IBM System/3 data processing card 18 as printed with a standard format card punch alignment. The punch card 18 may consist of an upper portion 20 which is suitable for listing or card punching of identifying and/or general information as to subject usage. Three six-row portions 22, 24, and 26 are laid out successively extending down the System/3 punch card 18. Each of the six-row sections 22, 24 and 26 includes space for standard row coding in accordance with B, A, 8, 4, 2, 1 standardized code, and each section 22 through 26 includes 32 successive columns extending across card 18. Thus, the card 18 includes spacing for 96 columns of coded information in all. It is foreseen that some types of playing card coding may utilize the upper portion 20 for disposition of an additional 32 column section of six rows per column.

Figure 3:
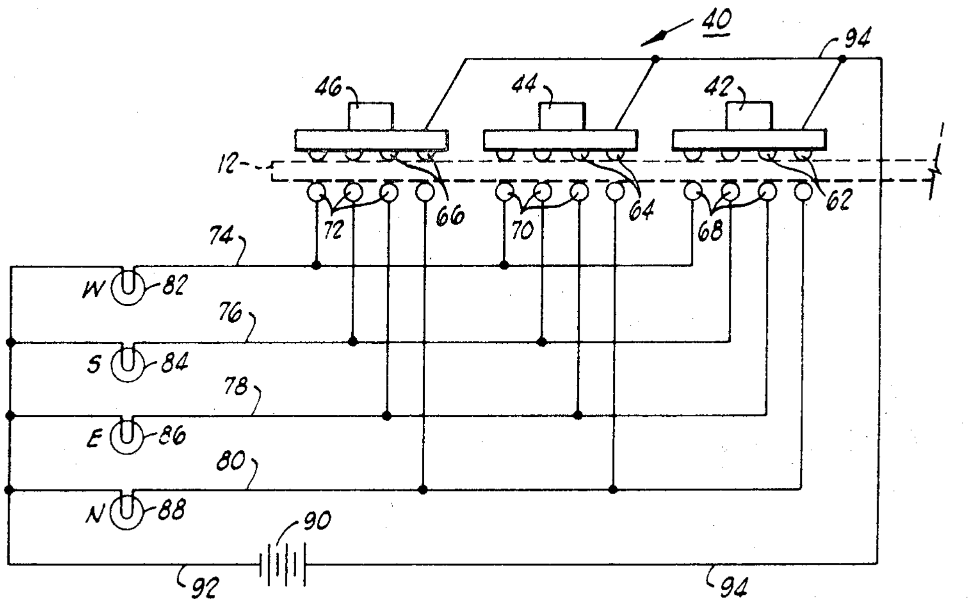
FIG. 3 is a schematic diagram of a form of card code reading apparatus as may be used in the present invention.

FIG. 3 shows one form of reading device 40 which is suitable for reading coded information from the System/3 playing cards to provide an indication of dealing distribution in accordance with a predetermined game plan. It is contemplated that reading devices such as device 40 will be utilized during home or casual play to distribute selected duplicate contract bridge hands for comparison play and relative scoring evaluation, and these may utilize various sizes and shapes of playing card, including standard size in some cases. By way of example then, four-row coding is employed and each of push button actuators 42, 44 or 46 will be selectively depressed in accordance with whatever the column and row section position where the card game is coded into the deck of System/3 playing cards. Also then, column selection is made through utilization of the associated apparatus of FIG. 4 wherein a laterally slidable key stop bar 48 is selectively positionable across a slide surface 50 (in the direction of arrow 52), to be held there by means of a detent mechanism 54 coacting with one of holes or indentions 56 which appear at each column position. The system/3 playing card, e.g., card 12, is slid into or placed on slide surface 50 along arrow 58 so that its respective key corner 14 will mate with the key surface 60 of key stop bar 48, this then bringing a selected three columns beneath the push button selectors 42 through 46.

Depression of one of the column selectors or actuators 42 through 46 through playing card 12 would cause one of the respective contactor elements 62, 64, or 66 to make contact with a respective contact member 68, 70 or 72 to provide electrical indication as to which playing card hand, i.e., north, east, south or west, will receive the particular playing card 12, in this case the jack of hearts.

A separate one of the four contacts of contact members 68, 70 or 72 is connected via a respective lead 74, 76, 78 or 80 to energize the appropriate indicator lamp 82, 84, 86 or 88, depending upon which hand is to receive the card in this particular game. Energizing power is applied by means of such as a battery 90 connected by lead 92 in parallel to each of lamps 82 through 88 while a return lead 94 is connected in parallel to each of the push-button contact selector actuators 42 through 46.

Figures 4, 5, 6:
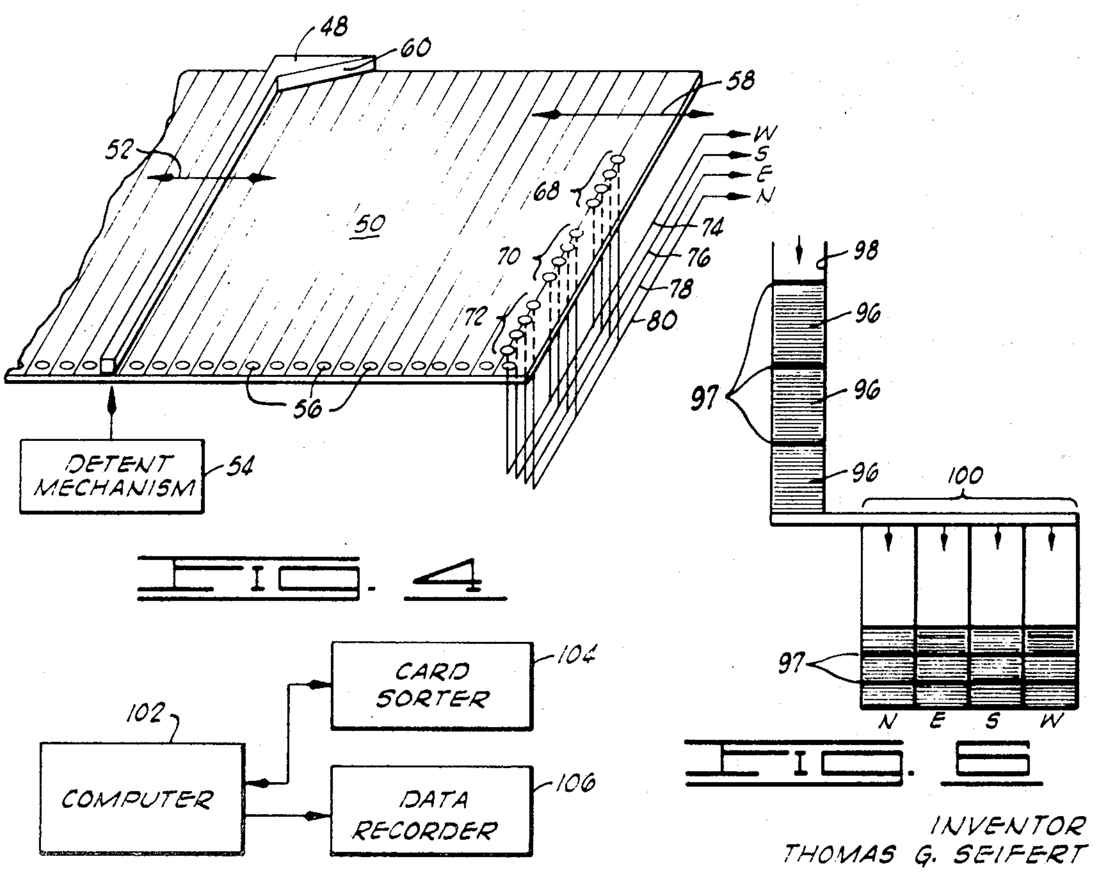
FIG. 4 is a perspective view, partially in schematic form, of another portion of the card reading apparatus and constructed in accordance with the present invention.
FIG. 5 is a block diagram of card and card hand analysis equipment as may be utilized in the present invention.
FIG. 6 illustrates in functional form the card sorting operation for a plurality of decks of cards.

The coactive structure in FIGS. 3 and 4 merely represents one basic form of card reading device which is suitable for individual use. It should be understood, too, that any of many types of contact selecting mechanisms, stop and detent mechanisms and other interactive elements of the overall reading device may be varied in accordance with the exigencies of the coding scheme.

In addition to individual usage for duplicate bridge card play and the like, the System/3 playing card also enables much more diversified use in large tournament play by utilizing standard card sorting apparatus and/or computer analysis and output recording of the game results. Thus, as shown in FIG. 5, an associated computer 90 may be employed in coaction with a card sorter 92 of conventional type for handling the System/3 type of playing card. In addition, and in accordance with programmed instruction to computer 90, output results may be applied to a data recorder 94 for the purpose of retaining information regarding play sequence, analysis, etc. The card sorting representation of FIG. 6 illustrates the manner in which a plurality of decks of System/3 playing cards can be divided into hand distribution (i.e., N, E, S or W) as required in such as a contract bridge duplicate play tournament. Thus, a plurality of decks of cards 96, each deck being followed by four coded trailer cards 97, may be placed in the input collector 98 whereupon the individual cards are successively sensed and placed in the respective output receptacles 100 representing North, East, South and West playing hands. Upon completion of sensing of a deck, each of coded trailer cards 97 is deposited in a respective receptacle 100 to isolate the N, E, S and W hands. As can be noted in FIG. 6, three additional playing card decks have already been deposited in the receptacles 100 in accordance with hand distribution in accordance with some controlled sort.

The foregoing description has dealt primarily with a four-row code wherein each of the 96 columns of the System/3 playing card could be separately coded (four-row code) to a different game, reference being again to a contract bridge game, but any of many four-handed games would also be recordable. The four-row code at each column position is merely utilized to indicate the hand position of the card in the distribution. This coding enables high speed sorting of predetermined bridge hands for such as duplicate play; however, it further enhances the entire operation if the distribution plus the sequence of leads and card-plays is also recorded thereby to enable later analysis and comparison for proprieties play.

Figure 7:
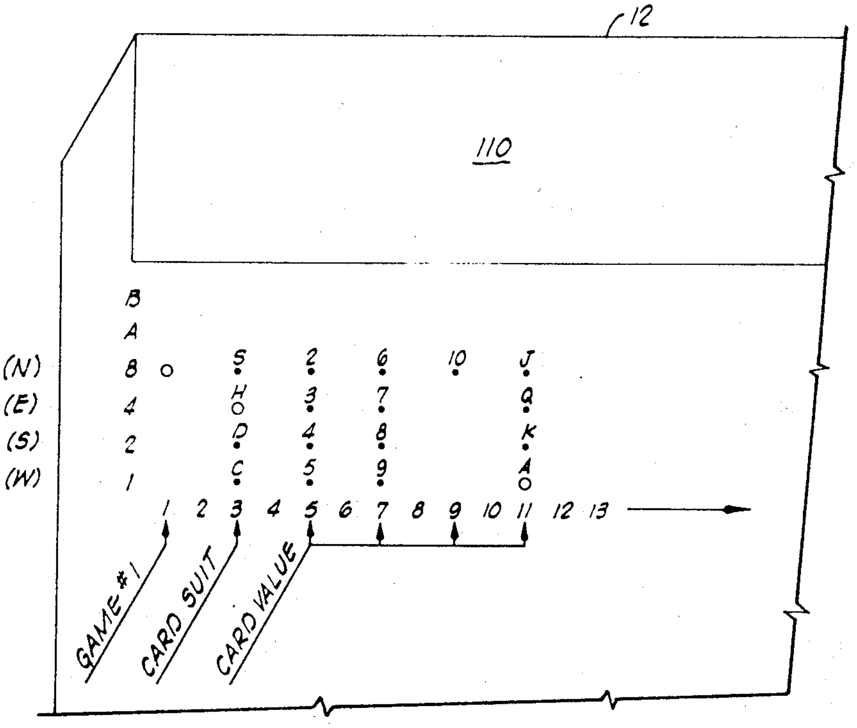
FIG. 7 illustrates an alternative form of coding format which enables previously played, selected contracted bridge hands to be computer analyzed as to proprieties of play.

Thus, each of the playing cards of the individual decks of System/3 playing cards can carry an additional code indicia as carried in some variable number of columns necessary to enable suit and card value coding. For, example as shown in FIG. 7, a simple coding scheme will enable card suit (Spade - S, Heart - H, Diamond - D and Club - C) to be coded in column 3, with card value coded in each of columns 5, 7, 9 and 11. All remaining columns 1, 2, 4, 6, 8, 10 and 12 through 96 may still be used to code the card for a given distribution per game. A primary reason for spreading out the card suit and card value columns is merely to maintain integrity of the game and further compound or make difficult the possibility of an opponent memorizing or reading the code punch configurations for certain cards. This is a very minimal danger and one not deserving of any great effort since the fanned playing cards, dummy or trailer card, and the players hand will always cover the card punch sectors from view of the opponents.

With further reference to FIG. 7, the System/3 playing card, e.g., a jack of hearts playing card 12 as shown in FIG. 1, may include identifying printing in space 110 or it may include further punch coding which identifies the game, scoring, precautions of play, etc. The playing card 12 will also include a suitable plurality of columns for coding card suit and card value, e.g., as shown for columns 3, 5, 7, 9 and 11 with all remaining columns providing bridge game information. Thus, column 2 may represent such as a game No. 2 while, similarly, remaining columns provide code punch spacing for additional games. Each game column is represented by the 8, 4, 2 and 1 code placed equal to North, East, South and West, respectively.

Figure 8:
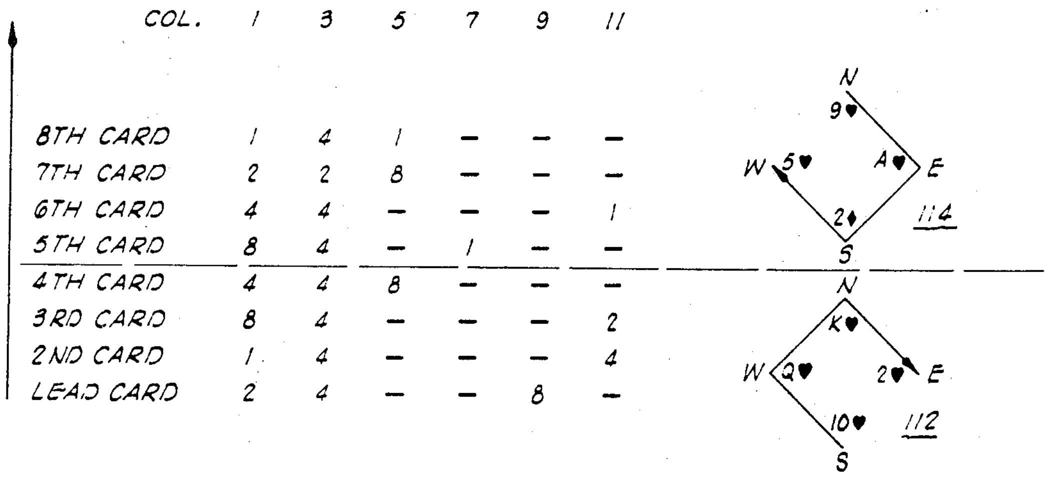
FIG. 8 is a listing of code relationships versus playing hands through the first two tricks of a representative, coded bridge game utilizing the FIG. 7 coding format.

FIG. 8 provides a graphic representation of the first two rounds of play (tricks) of contract bridge with System/3 playing cards coded in the manner of FIG. 7. Thus, the lead card is indicated in the game column 1 as originating from South (2 row) to play a heart (4 row position of column 3), and the proper play is the ten of hearts, (as denoted by the 8 row of column 9). The next or second card play is the West card, as indicated by the 1 row of column 1, to follow suit with a queen of hearts by 4 row punches at columns 3 and 11. The trick will be taken with the king of hearts as North, (row 8, column 1) plays the king, (row 2, column 11) of hearts (row, column 3) and, finally, the fourth card is played by East as a losing two of hearts play, as indicated in columns 1, 3 and 5.

The second trick of the game is then played with North leading a nine of hearts, East playing an ace of hearts, South trumping with a two of diamonds (assuming diamonds are trump), and West finally playing the five of hearts. The playing patterns as indicated by patterns 112 and 114 adjacent the graph sections for respective first and second trick coding merely represent the hand as it should be played and as it is coded in the cards. This may not necessarily be the way the players play the game, but, in that event, a computer analysis of the cards after play will show the error of their play at each and every instance.

In utilizing the card decks coded for card suit and card value, e.g., coded as in FIG. 7, it is necessary that care must be taken always to follow the correct rotation or turn of play, and that the played cards must be kept in the same order for eventual submission to the computational equipment for analysis. The cards (tricks) may be stacked at right angles to indicate team tricks for the purpose of count. When properly coded, the cards may be run through a reader, e.g., computer with peripheral magnetic tape storage, and/or a card sorter to record sequence of play. By reading the deck as stacked at the end of play, the bottom card would actually be the last card played on the first trick. The fourth card would be the lead, the fifth card would be the last card played on the second trick, with the eighth card being the second lead, etc. Reading of the game column and then the card suit and card value columns will enable sequence of play to be reconstructed and compared with original distribution.

It should be understood that the System/3 playing cards can be coded in any of numerous code arrangements and techniques for adaptation to any number of different reading or analyzing devices, but it should be kept in mind, too, that the card decks are still compatible with more simple home use devices which are capable of individually sensing a single deck for distribution in a predetermined bridge hand. Such home use devices may be further altered to specific size and shape, or then may utilize an adaptor for sorting the card hands. These may be classic bridge hands as prepunched in the card deck at the time of original sale to the customer, or the playing users may desire to use their own punch and coding facilities to code their respective System/3 playing card decks with predetermined bridge hands as derived from random dealing, newspapers and other publications. These too could provide computer input for processing relative to any number of computational programming routines responsive thereto. It is contemplated too that large scale tournament play could be carried out using cheap-to-print, throw-away-type cards as the fancy "face" cards and ornate back designs are not functional to the game.

It is also contemplated that such sensing devices as are exemplified by FIGS. 3 and 4 may be varied in structure. Thus, it may be desirable to provide return conduction from plate 50 with application of sensing voltage to respective ones of four contacts (representing card suit) held by pushbuttons 46, 44 and 42. This amounts to the reverse circuit as that indicated in FIGS. 3 and 4, but it may be more convenient and more facile of operation in some cases. Also, it may well be determined that a magnetic marking of individual playing cards is desirable and this may be readily carried out consonant with the teachings of the present application.

The foregoing discloses a novel method of forming playing cards from a standardized data processing information vehicle which enables both computer reading capability and manual playing ability in the manner of the long-time used and conventional playing card. It is possible to code directly either a single deck of playing cards or a large plurality of decks of playing cards in the case of tournament play, each of which is adaptable for direct input to card sorting and computational apparatus whereupon any number of additional data processing operations can be carried out to sort, classify or analyze the record data.

Changes may be made in the combination and arrangement of elements as heretofore set forth in the specification and shown in the drawings, it being understood that changes may be made in the embodiments disclosed without departing from the spirit and scope of the invention and defined in the following claims.

What is claimed is:

1. A method of utilizing standardized data processing punch cards of predetermined size and shape as playing cards so that the cards are susceptible of both automated processing and manual play, the method comprising:

selecting a plurality of standardized system/3 data processing cards equal to a complete deck of playing cards;

designating and punching each of a plurality of said data processing punch cards to indicate a predetermined card value and card suit;

marking permanently visually on one side of each of said data processing punch cards the predetermined different card value and card suit; and providing further code indicia by punching each card in a predetermined manner thereby to identify for each card that north, east, south or west hand position which receives the card for a predetermined card game.

2. A method as set forth in claim 1 which is further characterized to include the step of:

providing still further code indicia by punching each card in a predetermined manner identifiable with said different card suit and card value designations.

3. A method as set forth in claim 1 wherein said step of providing further code indicia also comprises:

designating for punch indicia a plurality of plural row columns where each column of each punch card receives characteristic code punch designating the hand position to receive the card, and a selected column for all cards represents a different predetermined card game distribution.

4. A method as set forth in claim 3 which includes 96 plural row column designators each identifying a different card game distribution.

5. A method as set forth in claim 3 wherein said plural row columns each consist of a column of four row punch positions for binary representation of the hand position receiving the designated card.

6. A method as set forth in claim 3 which is further characterized to include the step of:

providing still further code indicia by punching each card in a predetermined manner identifiable with said different card suit and card value designations.

7. In an automated electronic data processing system responsive to input of standardized punch cards of predetermined size and shape, which are also used for manual card game play, the method of:

designating, punching and permanently visually marking 52 of said punch cards with predetermined different ones of 13 card values and four card suits;

providing a plurality of four-row columns on each of said playing cards, each of said four-row columns having one of four rows punched to indicate the North, East, South or West hand which retains the card for a predetermined card game distribution which is represented by that particular column.

8. In the method of claim 7, the further step comprising:

providing still further code indicia by punching each card in a predetermined manner identifiable with said different card suit and card value designations.

9. The method of claim 7 wherein said punch card is an IBM System/3 data processing card.

10. The method of claim 9 wherein said punch card has 96 four-row columns each coded binarily to identify hand position for a predetermined contract bridge game.

11. The method of claim 9 wherein said punch card has one four-row column binarily coded to designate card suit, four four-row columns binarily coded to designate card value, and the remaining ones of the four-row columns binarily coded to identify hand position for a predetermined contract bridge game.

* * * * *